United States Patent

Biber

[15] 3,646,865
[45] Mar. 7, 1972

[54] ELECTRONIC FLASHLAMP CONTROL NETWORK

[72] Inventor: Conrad H. Biber, Needham, Mass.
[73] Assignee: Polaroid Corporation, Cambridge, Mass.
[22] Filed: Nov. 7, 1969
[21] Appl. No.: 874,826

[52] U.S. Cl. ..........................95/11.5 R, 95/10 C, 95/44 EB, 315/180
[51] Int. Cl. .......................................................G03b 9/70
[58] Field of Search ................95/10 C, 11.5, 44, 44 C, 45 X; 315/241 P

[56] References Cited

UNITED STATES PATENTS

| | | | |
|---|---|---|---|
| 2,969,721 | 1/1961 | Casselman et al. | 315/241 P |
| 3,344,704 | 10/1967 | Simpson et al. | 355/69 |
| 3,491,667 | 1/1970 | Land | 95/45 X |

Primary Examiner—John M. Horan
Assistant Examiner—Thomas A. Mauro
Attorney—Brown and Mikulka, William D. Roberson and Michael Bard

[57] ABSTRACT

A circuit is provided for automatically inducing an actinic discharge in a gas discharge photoflashlamp in response to the actuation of a camera shutter. Means are provided for electronically controlling the duration of the actinic discharge as a function of camera focus setting.

Basically, the duration control means comprises a capacitor in the discharge path of a photoflashlamp and shunted by an electronic switch. The switch is normally closed so as to short circuit the capacitor. A timing circuit opens the switch after a time interval determined by the camera focus setting and causes the lamp to quickly charge the capacitor in its discharge path so as to terminate the actinic discharge emanating from the lamp.

13 Claims, 1 Drawing Figure

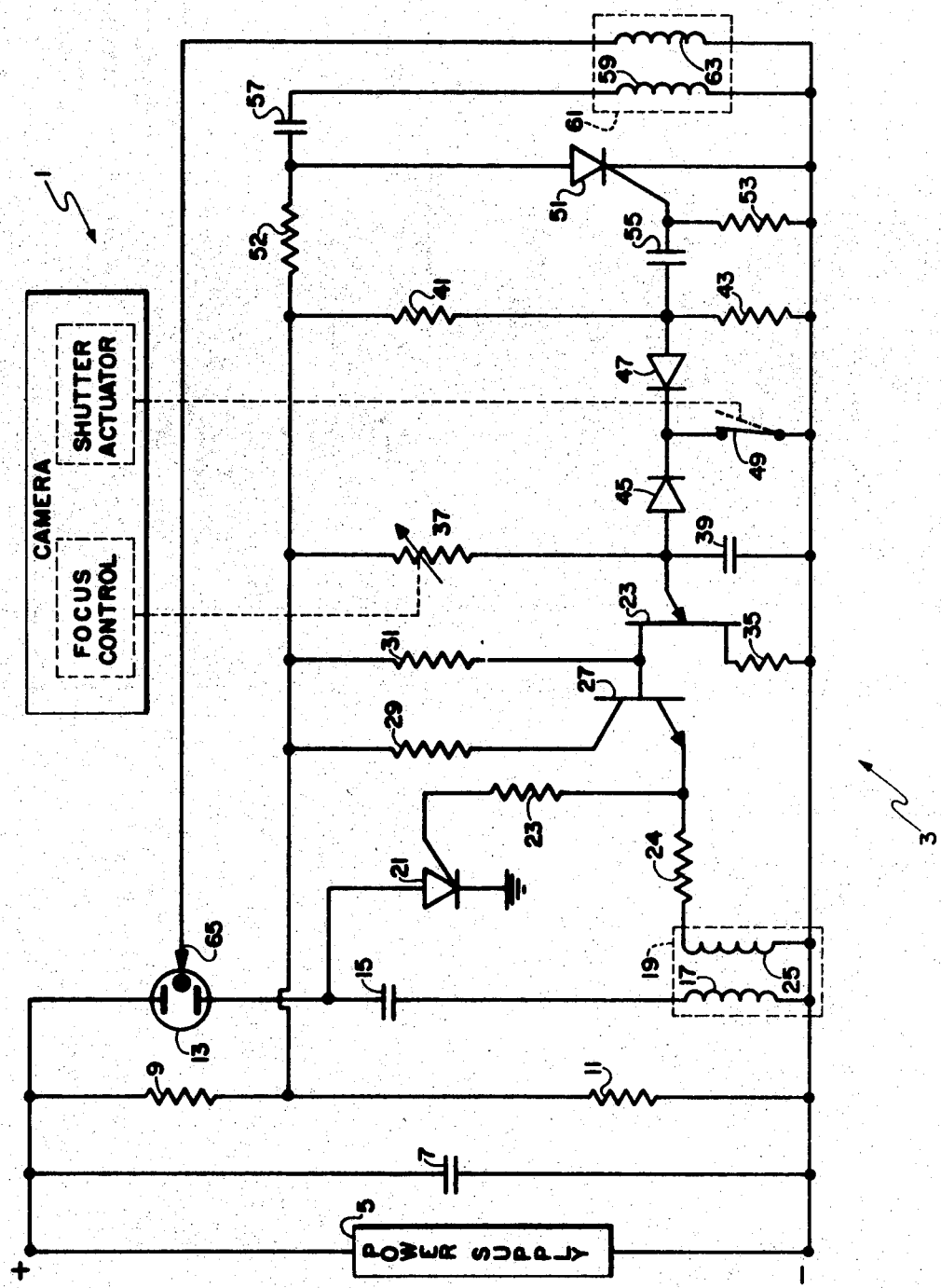

ELECTRONIC FLASHLAMP CONTROL NETWORK

BACKGROUND OF THE INVENTION

The present invention relates, generally, to photoflashlamp control networks and, more particularly, to an improved means for controlling the duration of the actinic discharge from a photoflashlamp in response to the focus setting of a camera.

Many photoflashlamp control networks have been developed for producing flashes of different intensities for different exposure situations. Basically, these circuits eliminate the problems of adjusting the camera controls to provide a proper exposure with a constant light source, such as is available from a conventional photoflash system.

Typical of such prior art devices, a relatively high voltage is stored in a capacitor. At the instant that the camera shutter is actuated, the capacitor is discharged through a photoflashlamp (gas-filled tube) to provide the desired light. Generally, means are provided for shunting the discharge circuit of the photoflashlamp to effectively terminate the discharge after a preset time interval in accordance with the focus setting of the camera.

The time interval is determined by an RC timing circuit which is slaved to the camera focus control and which activates a switching network so as to short circuit the photoflashlamp.

SUMMARY OF THE INVENTION

The instant invention provides a photoflash network adapted to produce a light flash of predetermined duration and, hence, energy, in accordance with a desired photographic exposure.

The network is designed to overcome the problems inherent in prior art systems wherein the photoflashlamp is short circuited, after a predetermined time interval, to terminate its discharge. Such systems must necessarily dissipate any stored energy in the short circuiting means.

Basically, the subject invention comprises a small capacitor, in shunt with an electronic switch, serially connected into the discharge path of a photoflashlamp. A large capacitor is connected across the photoflashlamp and its serially connected small capacitor to provide the necessary energy for sustaining an actinic discharge in the photoflashlamp.

The electronic switch is normally closed so as to short circuit the small capacitor and permit the photoflashlamp to maintain a relatively unimpeded actinic discharge.

When the electronic switch opened, the photoflashlamp will be forced to discharge through the small capacitor, which will very quickly charge to capacity and terminate the actinic discharge. Since the small capacitor is in series with the photoflashlamp, the large capacitor will only lose that energy necessary to sustain the actinic discharge and to charge the small capacitor.

Triggering of the electronic switch is controlled in accordance with a preset timing circuit, whose charging time is adjustable by means of the camera focus control, so that the total energy output of the photoflashlamp is made a function of the camera-to-subject distance.

When maximum light output from the photoflashlamp is needed, the timing circuit is automatically adjusted by the focus control to delay triggering the electronic switch off until all the available energy has been converted into an actinic discharge. When less light is needed, the timing circuit is automatically regulated to trigger the switch off relatively quickly and charge the small capacitor in the photoflashlamp discharge path. By automatically varying the delay provided by the timing circuit, with the camera focus control, the amount of light output from the photoflash tube is varied to automatically provide the correct exposure.

Accordingly, it is an object of the instant invention to provide a means for controlling the duration of the actinic discharge from a photoflashlamp.

Another object of the instant invention is to provide a means for automatically controlling the duration of the actinic discharge from a photoflashlamp as a function of the focus setting of a camera.

Still another object of this invention resides in the provision of means for automatically switching a small capacitor into the discharge path of a photoflashlamp, at a predetermined time subsequent to the activation of the camera shutter, so as to rapidly terminate any actinic discharge emanating from the photoflashlamp and minimize any energy loss incident thereto.

Other objects and many of the attendant advantages of the present invention will be better appreciated and said invention will become clearly understood by reference to the following detailed description when considered in conjunction with the accompanying drawing illustrating one embodiment of the instant invention, wherein the FIGURE represents a simplified schematic of the instant invention.

Referring to the drawing in more detail, a camera, having a shutter actuator and a focus control, is shown generally at 1. The camera is operably associated with a photoflashlamp control network 3, in a manner to be more fully described hereinafter.

The control network 3 includes a stabilized DC power supply 5, such as is common in the art, across the output of which is connected a capacitor 7. A pair of resistors 9 and 11, respectively, are serially connected across the output of the power supply 5 to effect a voltage divider network.

A photoflashlamp 13 is serially connected with a capacitor 15 and the secondary winding 17 of a transformer 19 across the output of the power supply 5. A silicon-controlled rectifier 21 has its anode connected between the photoflashlamp 13 and the capacitor 15, its cathode grounded and its gate serially connected through a pair of resistors 23 and 24 and the primary winding 25, of the transformer 19, to the negative side of the power supply 5.

An NPN-transistor 27 has its collector connected to one side of a resistor 29, the other side of which is connected to the junction of the resistors 9 and 11. The emitter of the transistor 27 is connected between the resistor 23 and the resistor 24, and its base is connected through a resistor 31 to the junction of said resistors 9 and 11.

A unijunction transistor 33 is connected in series with the resistor 31 and a resistor 35, between the junction of the resistors 9 and 11 and the negative side of the power supply 5.

A variable resistor 37 is serially connected with a capacitor 39 between the junction of the resistors 9 and 11 and the negative side of the power supply 5 so as to form an RC timing network.

The variable resistor 37 is slaved to the focus control of the camera 1 so that its resistance will vary as a function of the focus setting of the camera 1.

A pair of serially connected resistors 41 and 43 are connected across the resistor 11 and function as a voltage divider network. A pair of diodes 45 and 47 have their cathodes joined and their anodes connected to the junction of the resistor 37 and the capacitor 39 and the junction of the resistors 41 and 43, respectively.

A single-pole, single-throw switch 49 is connected between the junction of the diodes 45 and 47 and the negative side of the power supply 5 so as to effectively shunt, in the closed position, the capacitor 39 and the resistor 43 through the diodes 45 and 47, respectively.

A silicon-controlled rectifier 51 is connected, through a resistor 52, across the resistor 11 with its cathode connected to the negative side of the power supply 5 and its gate connected to the negative side of said power supply 5 through a resistor 53, which serves to prevent unwanted triggering of the silicon-controlled rectifier 51 by circuit transients.

A capacitor 55 is connected between the junction of the resistors 41 and 43 and the gate of said silicon-controlled rectifier 51, and a capacitor 57 is serially connected with the primary winding 59 of a transformer 61 across the silicon-controlled rectifier 51.

The secondary winding 63 of said transformer 61 is connected between the negative side of the power supply 5 and the trigger electrode 65 of the photoflashlamp 13.

Considering the operation of the network 3 in more detail, let us assume the capacitor 7 has been fully charged, the photoflashlamp 13 is not conducting, the capacitor 15 is completely discharged as is the capacitor 39, the silicon-controlled rectifier 51 is not conducting nor is the silicon-controlled rectifier 21, and the switch 49 is in its normally closed position.

Under these circumstances the capacitor 39 will be short circuited such that the emitter of the unijunction transistor 33 will not be forward biased and it will not be conducting. This will create a forward-biasing potential across the base-emitter junction of the transistor 27 and a positive signal at the gate of the rectifier 21. The resistor 43 will also be short circuited.

Activating the shutter actuator of the camera 1 will open the switch 49, the potential across the resistor 43 will rapidly increase, sending a pulse through the capacitor 55 which in turn will turn on the silicon-controlled rectifier 51, transmitting a triggering pulse through the capacitor 57 and the transformer 61 to the trigger electrode 65 of the photoflashlamp 13. The lamp 13 will fire in response to the triggering pulse supplied to the electrode 65 and current will flow through the lamp 13 (causing an actinic discharge therein) and the silicon-controlled rectifier 21 to ground.

In a time interval, determined by the impedance of the resistor 37 (which will vary as a function of the focus setting of the camera 1) and the capacitor 39, the potential across said capacitor 39 will increase to the point where the unijunction transistor 33 will be turned on. At this point the base-emitter junction of the transistor 27 will no longer be forward biased, a negative potential will be applied to the gate of the silicon-controlled rectifier 21, and a negative pulse will be transmitted through the transformer 19 and the capacitor 15 to the anode of said silicon-controlled rectifier 21. This negative pulse to the anode of the rectifier 21 will cause it to turn off, placing the capacitor 15 in the discharge path of the flashlamp 13.

The capacitor 15 is of very much smaller storage capacity than the capacitor 7. Accordingly, upon being switched into the discharge path of the lamp 13, the capacitor 15 will quickly charge to a potential sufficient to turn off the lamp 13 and prevent further discharge of the capacitor 7 therethrough.

To reiterate, activation of the shutter actuator of the camera 1 will open a switch, sending a triggering signal to the lamp 13 and initiating an actinic discharge therein.

After a time interval determined by an RC timing network and, more particularly, by the setting of the variable resistor 37 thereof (which is controlled by the camera 1 focus control) the silicon-controlled rectifier 21 will be turned off, causing the lamp 13 to discharge through the small capacitor 15 and quickly turn off. The lamp 13 will turn off without rapidly discharging the capacitor 7 as is typically done in prior art systems.

It can readily be seen that many variations and modifications of the present invention are possible in the light of the aforementioned teachings and it will be apparent to those skilled in the art that various changes in form and arrangement of components may be made to suit requirements without departing from the spirit and scope of the invention. It is therefore to be understood that within the scope of the appended claims the instant invention may be practiced in a manner otherwise than is specifically described herein.

What is claimed is:

1. An electronic control network for regulating the light output of a gas discharge flashlamp, including:
    means for creating a potential difference across said lamp sufficient to initiate an actinic discharge therein in response to a control signal;
    means for supplying a control signal to said lamp for triggering an actinic discharge therein at a predetermined time;
    means connected to the lamp for rapidly decreasing the potential difference across said lamp and terminating the actinic discharge therein; and
    means for shunting said potential difference decreasing means for a predetermined time interval.

2. The invention as recited in claim 1, further including a photographic camera having a focus control and a shutter actuator, wherein said control signal supplying means is operably connected to said shutter actuator and said shunting means is operably connected to said focus control whereby said predetermined time interval will vary as a function of camera focus setting.

3. The invention as set forth in claim 2, wherein said control signal supplying means includes a switch and said shunting means includes a network, having a time constant, operably associated with said switch so as to be actuated thereby simultaneously with the application said triggering control signal to said flashlamp.

4. The invention of claim 1, wherein said shunting means includes an electronic switch connected to said lamp and capable of shunting said potential difference decreasing means.

5. The invention as related in claim 4, wherein said potential difference creating means includes a capacitor and said potential difference decreasing means comprises a capacitor having a lower storage capacity than the first-mentioned capacitor.

6. The invention as defined in claim 3, wherein said shunting means includes an electronic switch connected to said lamp and capable of shunting said potential difference decreasing means.

7. The invention as set forth in claim 6, wherein said potential difference creating means includes a capacitor and said potential difference decreasing means comprises a capacitor having a lower storage capacity than the first-mentioned capacitor.

8. The invention of claim 7, wherein said electronic switch comprises a silicon-controlled rectifier, having an anode, a cathode and a gate, operably connected to said lamp so as to be switched on to provide a low-impedance discharge path upon the initiation of an actinic discharge in said flashlamp.

9. The invention as defined in claim 8, additionally including means responsive to said network having a timing constant for simultaneously providing control signals to the anode and the gate of said silicon-controlled rectifier, whereby said rectifier will be switched off a predetermined time after initiation of said actinic discharge.

10. The invention as related in claim 9, wherein said network having a time constant includes a variable resistor operably connected to said focus control whereby changes in the focus setting of said camera will effect corresponding changes in said time constant.

11. In combination with an electronic gas discharge flashlamp and a camera having a shutter actuator and a focus control, an electronic flashlamp control network, including:
    means for creating a potential difference across said flashlamp sufficient to create an actinic discharge therein in response to a trigger signal;
    first switch means connected to said shutter actuator and activated thereby for initiating a trigger signal to said flashlamp;
    means connected to said flashlamp for decreasing the potential difference thereacross sufficient to terminate any actinic discharge therein;
    second switch means activated in response to said first switch means and connected to said flashlamp for shunting said potential decreasing means for a predetermined time interval; and
    means connected to said first switch means and said second switch means for deactivating the latter a predetermined time interval after actuation of the former.

12. The invention of claim 11, wherein said potential-decreasing means comprises a capacitor serially connected within the discharge path of said flashlamp.

13. The invention as related in claim 12, wherein said second switch means comprises a silicon-controlled rectifier having an anode and a gate and wherein said rectifier is operably connected to said deactivating means, whereby said deactivating means will simultaneously supply negative signals to both the anode and the gate of said silicon-controlled rectifier sufficient to switch it off.

* * * * *